(12) United States Patent
Zuckerman

(10) Patent No.: US 8,919,030 B2
(45) Date of Patent: Dec. 30, 2014

(54) FISHING ROD REEL FOOT AND REEL SEAT

(76) Inventor: Steve Zuckerman, Los Angeles, CA (US)

( * ) Notice: Subject to any disclaimer, the term of this patent is extended or adjusted under 35 U.S.C. 154(b) by 726 days.

(21) Appl. No.: 13/076,146

(22) Filed: Mar. 30, 2011

(65) Prior Publication Data

US 2011/0239518 A1    Oct. 6, 2011

Related U.S. Application Data

(60) Provisional application No. 61/319,689, filed on Mar. 31, 2010.

(51) Int. Cl.
*A01K 87/06* (2006.01)

(52) U.S. Cl.
CPC ..................... *A01K 87/06* (2013.01)
USPC ............................................................ 43/22

(58) Field of Classification Search
USPC ............................................................ 43/22
See application file for complete search history.

(56) References Cited

U.S. PATENT DOCUMENTS

| | | | | |
|---|---|---|---|---|
| 2,456,681 | A | * | 12/1948 | Culver ............................... 43/22 |
| 2,484,223 | A | * | 10/1949 | Henshaw ........................... 43/22 |
| 2,582,289 | A | * | 1/1952 | Smith ........................... 242/297 |
| 2,655,756 | A | * | 10/1953 | Polis .................................. 43/20 |
| 2,699,622 | A | * | 1/1955 | Stevens .............................. 43/23 |
| 2,787,857 | A | * | 4/1957 | Schlegelmilch ................... 43/22 |
| 3,419,992 | A | * | 1/1969 | Strahm ........................ 242/236 |
| 3,570,165 | A | * | 3/1971 | Murval .............................. 43/22 |
| 3,618,253 | A | * | 11/1971 | Edwards ........................... 43/26 |
| 4,026,060 | A | * | 5/1977 | Barnes ............................... 43/22 |
| 4,718,586 | A | | 1/1988 | Hagino |
| 4,962,608 | A | * | 10/1990 | Loomis et al. ............. 43/18.1 R |
| 6,102,717 | A | | 8/2000 | Aoki et al. |
| 6,193,387 | B1 | | 2/2001 | Schlichting |
| 6,513,876 | B1 | | 2/2003 | Agler et al. |
| 7,086,195 | B2 | * | 8/2006 | Borgeat ................... 43/18.1 CT |
| 7,306,290 | B2 | | 12/2007 | Wiecek |
| 7,370,421 | B2 | | 5/2008 | Onion et al. |
| 7,543,786 | B2 | | 6/2009 | Yang |

* cited by examiner

*Primary Examiner* — Christopher P Ellis
(74) *Attorney, Agent, or Firm* — Risso & Associates

(57) ABSTRACT

A fishing rod assembly is described. The assembly includes a butt connector that is formed to connect with and between a fishing rod and a rod butt. The butt connector also includes a reel seat formed thereon that has two posts (e.g., cylindrical extensions) protruding therefrom. Additionally, a reel foot is included for connecting with a fishing reel. Alternatively, the reel foot can be integrally formed with a fishing reel. In either event, two cutouts are formed in the reel foot to engage with the extensions of the butt connector and affix the fishing reel with the butt connector. Thus, using the reel foot and corresponding reel seat, a user can quickly and firmly attach the fishing reel with a fishing rod.

8 Claims, 6 Drawing Sheets

FISHING ROD REEL FOOT AND REEL SEAT

PRIORITY CLAIM

This is a non-provisional application of U.S. Provisional Application No. 61/319,689, filed on Mar. 31, 2010, and entitled, "Fishing Rod Reel Foot and Reel Seat."

BACKGROUND OF THE INVENTION (1) Field of Invention

The present invention relates to a fishing rod assembly and, more particularly, to a fishing rod reel foot and reel seat that are formed to quickly and securely affix a fishing reel with a fishing rod.

(2) Description of Related Art

Fishing rods have long been known in the art. A fishing outfit typically consists of a rod, reel and line.

The rod normally consists of several basic components, as described below. A "rod blank" tapers from its base to its tip and is commonly made out of fiber glass, graphite, bamboo, or less commonly used materials, or blends of materials. The rod blank has line guides and a tip guide for the purpose of "guiding" the "line" (which is wound onto the reel) from the reel uniformly along its length without touching the rod blank. The line "guides" permit the rod to bend precisely the way it was designed to bend when a hooked fish pulls on the end of the line. The placement of the reel on the rod can subtly change the intended dynamics of how it bends (the angle) when the angler asserts resistance against a fish with a reel drag or with the use of his/her finger(s) on the line.

The "guides" are typically attached to the rod blank via thread that is wrapped around the feet of the guides and then varnished. The number, position, and size of the "guides" depend upon the length of the rod, the location of the "spine" of the rod blank, the nature of the tip ("fast taper" to "slow taper"), and/or the specifications established by the rod-maker.

On the rod is typically a "butt" section on which a reel is intended to be mounted. Where the reel is mounted is referred to as a "reel seat." The "reel seat" provides a means to attach a reel to the rod, anchoring the reel. On the reel there are typically two narrow, thin feet. The forward foot is inserted in a secured grove that is permanently built into the rod butt. The rear foot is inserted in a metallic or plastic "ring piece", which has the same groove design as the rear foot. This "ring piece" freely moves from the secured (forward) groove to the bottom of the reel seat. From the forward groove to the bottom of the reel seat is a "screwed" surface, which is machined or molded onto the rod butt. The purpose of this surface is to permit the "ring piece" to be adjusted incrementally by turning it clockwise for tightening (and securing the reel on the reel seat) the rear foot or turning it counterclockwise for loosening the foot so that the reel can be removed from the reel seat. The twisting of the thin "ring piece" depends upon the angler; thus, it is impossible to create a consistent tightening. In other words, securing the reel to the reel seat is imprecise. As such, the entire stability of the reel on the rod depends on how well it fits into the forward and rear groove; and how tight the rear foot is secured with the nuts.

As an alternative to the design described above, some reels include a small extension on both sides of the feet, which permits a "bracket" to be attached 180 degrees from the mounted surface. The bracket is secured by one screw on each side of the bracket's surface and provides a safety feature for the added stability of the reel on the rod butt.

In any connection of the reel to the rod, an angler depends on establishing a secure, stable connection of the fishing reel to the rod butt section of the fishing rod. Otherwise, when casting line from the reel or fighting a fish, the reel can turn in the seat on the rod butt. This can often lead to the reel falling off of the rod butt or shifting position. If the reel shifts, the angle changes in which the line travels through the first guide, touching one or more of the rod guide(s). Any friction on the line weakens its tensile strength, resulting in an undesirable handicap.

Another issue with existing designs is the time it takes to install a reel on a rod butt. To best secure the reel, an angler uses brackets which are attached under the reel seat. The brackets are screwed into the base of the reel which protrudes beyond the reel seat. This feature also makes it possible to attach a reel to a rod without any reel seat. Such a mounting could require minutes to complete and provides for a degree of user error, as the mounting is done by "sight." In other words, the reel needs to be positioned such that the line coming off the reel is parallel to the rod and aligned such that it passes directly through the rod guides. As can be appreciated, not all anglers are capable of such a precise alignment. The time to install a reel onto a rod can take from approximately ten (10) seconds to over a minute if one uses the bracket to ensure the security of the reel.

Thus, a continuing need exists for a fishing rod reel foot and butt connector with a corresponding reel seat that enables an angler to quickly and accurately secure a fishing reel with the fishing rod.

SUMMARY OF INVENTION

While considering the failure of others to make use of all of the above steps and components in this technology space, the inventor unexpectedly realized that a fishing rod reel foot and corresponding butt connector (and its reel seat) would allow an angler to quickly and accurately secure a fishing reel with the fishing rod.

More specifically, the present invention is directed to a butt connector that is formed to connect with and between a fishing rod and a rod butt. The butt connector includes a reel seat having a reel seat connector for connecting with a reel foot connector. A corresponding fishing reel with a bracket and reel foot is included. The reel foot has a reel foot connector for connecting with the reel seat connector, thereby allowing a user to quickly attach a fishing reel with the reel seat. Alternatively and as can be appreciated by one skilled in the art, the reel seat can be integrally formed with the rod butt to circumvent the need for a separate butt connector.

In one aspect, the reel seat connector includes two posts that project from the reel seat. Further, the reel foot connector includes two cutouts that traverse the reel foot. The two cutouts are formed to engage with the posts of the reel seat and affix the fishing reel with the butt connector. The cutouts are formed such that an angle exists between the cutouts, the angle being less than ninety one degrees.

In another aspect, the reel seat connector includes two recesses formed therein and the reel foot connector includes two posts for positioning within the recesses.

In yet another aspect, a locking mechanism is connected with the butt connector. The locking mechanism is formed to allow a user to selectively lock the reel foot with the reel seat. For example, the locking mechanism is a pivoting bar that can be pivoted up to prevent the reel foot from swinging away from the reel seat.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
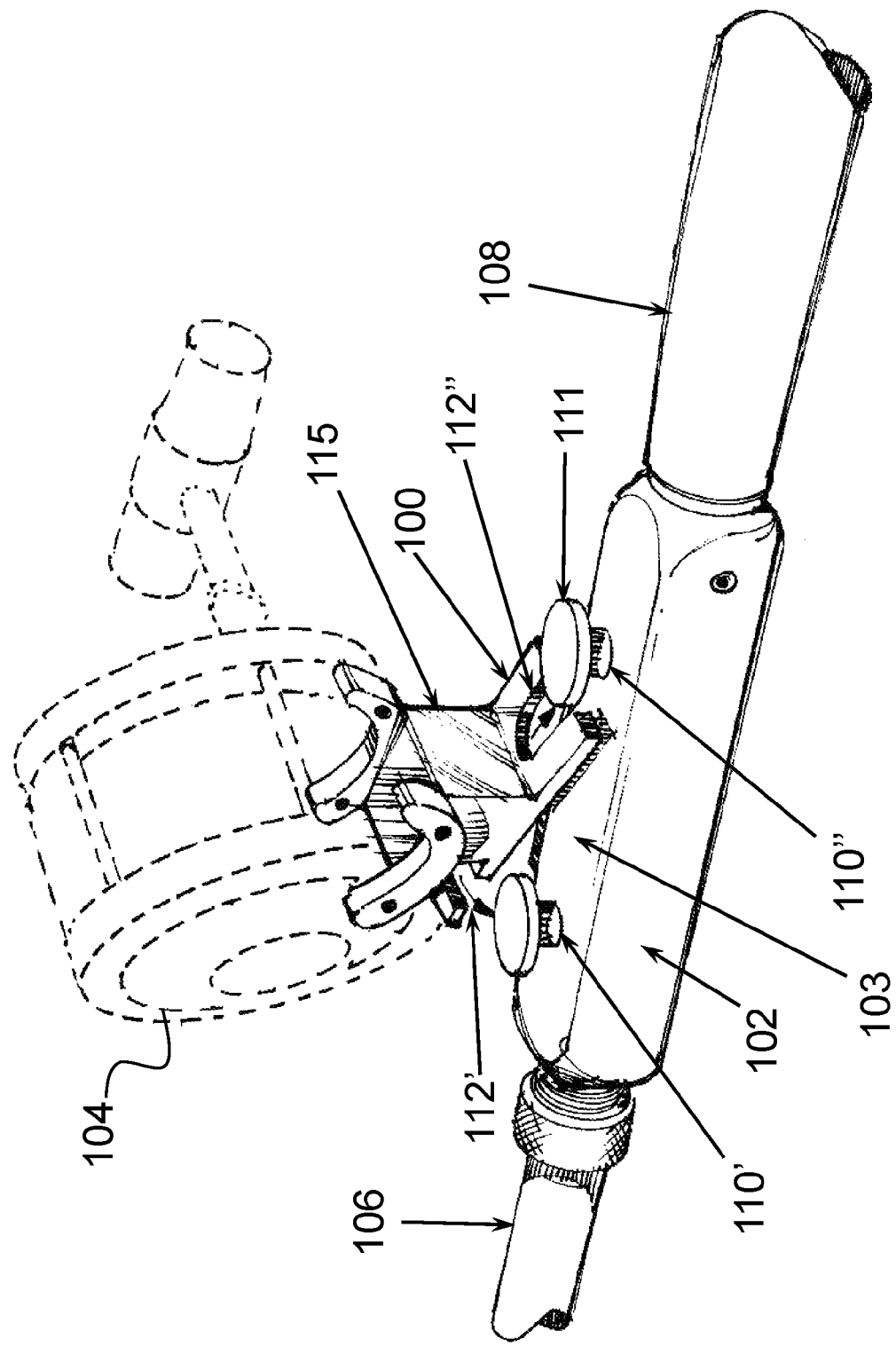
FIG. 1 is a perspective-view illustration of a reel foot and corresponding butt connector according to the present invention.

The present invention relates to a fishing rod assembly and, more particularly, to a fishing rod reel foot and reel seat that are formed to quickly and securely affix a reel with a fishing rod. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

As noted above and as depicted in FIG. 1, the present invention relates to a fishing rod reel foot 100 and butt connector 102 (with its corresponding reel seat 103) that are formed to quickly and securely affix a reel 104 with a fishing rod 106 and/or butt 108. It should be noted that the present invention can be used to retrofit existing rods and reels or, alternatively, be applied to a completely new rod, reel seat, and rod butt piece of equipment.

For example, in retrofitting existing rods, on the rod butt 108, parallel to the line guides, a flat base (i.e., butt connector 102) is installed. The butt connector 102 has surface that provides a reel seat 103. The reel seat 103 includes a reel seat connector for attaching with a corresponding reel foot connector. The reel seat connector is any suitable mechanism or device that allows the reel seat 103 to fixedly connect with the reel foot connector, a non-limiting example of which includes at least two mounted connection posts (a first post 110' and a second post 110") of any suitable size and dimensions. As a non-limiting example, the connection posts 110' and 110" are formed as cylindrical extensions, whose diameter and distance apart depend upon the size of the reel 104. The larger the reel 104, the larger will be the diameter and the space between the posts 110' and 110". The distance between the two post components is important. Each of the two posts 110' and 110" has a cap 111 that serves to prevent a reel foot 100 from sliding off of the posts 110' and 110". To the eye, each post 110' and 110" appears like a large un-grooved screw extension on the butt connector 102. It should be noted that although the reel seat 103 has been described as flat and the posts have been described as two cylindrical extensions, the present invention is not intended to be limited thereto as variations of the shape, size and number of said components can be envisioned to accomplish the same connection functionality.

Attached with the reel 104 is the reel foot 100. The reel foot 100 includes a bracket 115 that connects directly with the reel 104. The reel foot 100 and bracket 115 can be integraly formed with the reel 104 or sold as an add-on to be affixed with existing reels 104. For example, the bracket 115 can include screws and a clamp mechanism that allow it to clamp securely with a pre-existing reel 104. Although not limited thereto, the figures depict the reel foot 100 and bracket 115 as being an integral component to a reel 104.

The reel foot 100 is any suitable mechanism or device that is operable for attaching a reel 104 with the reel seat 103. In doing so, the reel foot 100 includes a reel foot connector that allows a user to selectively attaching the reel foot 100 with the corresponding reel seat connector of the reel seat 1003. As a non-limiting example, in the case of the posts 110' and 110", the reel foot 100 is a machined part with two cutouts (a first cutout 112' and a second cutout 112"). In this example, the cutouts 112' and 112" serve as the reel foot connector. The width of each of these two cutouts 112' and 112" is slightly greater than the diameter of the rod butt posts 110' and 110". The cutouts 112' and 112" are slits or slots that traverse into the reel foot 100 and end in a half circle-shape to matingly engage with the corresponding post 110' or 110".

The shape of the reel foot 100 is further depicted in FIG. 2A. FIG. 2A provides a bottom-view illustration of the reel foot 100, showing both the first cutout 112' and the second cutout 112", with the corresponding angle 113 between the cutouts 112' and 112". As noted above, the two cutouts 112' and 112" are slots that are cut into the reel foot 100 at any suitable angle 113 to allow the reel foot 100 to slide on and matingly and fixedly engage with the posts. As a non-limiting example, the angle 113 between the cutouts 112' and 112" is desirably less than or equal to approximately (90) degrees (or at any suitable angle). In other words, the angle 113 is desirably less than ninety one (91) degrees.

As shown in FIG. 2B, to mount the reel 104, a user positions the reel foot 10 onto the reel seat 103 and inserts the second cutout 112" (i.e., rear slot) of the reel foot 100 onto the second post 110" so that it fits snugly around the second post 110". As shown in FIG. 2C, the user then rotates the reel 104 (and reel seat 100) about the second post 110" so that the first cutout 112' (i.e., forward slot) fits around the first post 110'. As shown in FIG. 2D, the reel 104 is snugly fit against the reel seat 103 of the butt connector 102 and cannot move unless it rotates back.

It should be understood that FIGS. 2B through 2D illustrate the reel 104 in a stationary position to avoid confusing the figures. However, as can be appreciated by one skilled in the art, the reel 104 can be fixedly attached with the reel foot 100 (as depicted in FIG. 1). Thus, in actual operation, the reel 104 would rotate along with the reel foot 100 as the reel foot 100 is being attached with the butt connector 102.

In order to prevent the reel foot 100 from rotating out of position, there is a small locking mechanism 200 that is used to keep the reel foot 100 fixedly connected with the butt connector 102. As a non-limiting example, there is a small locking mechanism 200 on the rod butt connector 102 that keeps the reel foot 100 from rotating out of position. The locking mechanism 200 is any suitable mechanism or device that performs such a function. For example, the locking mechanism 200 can simply be a bracket or slide that pivots into position to keep the reel foot 100 secure. A small ball detent can also be included to keep the locking mechanism 200 in place.

Figure 3:
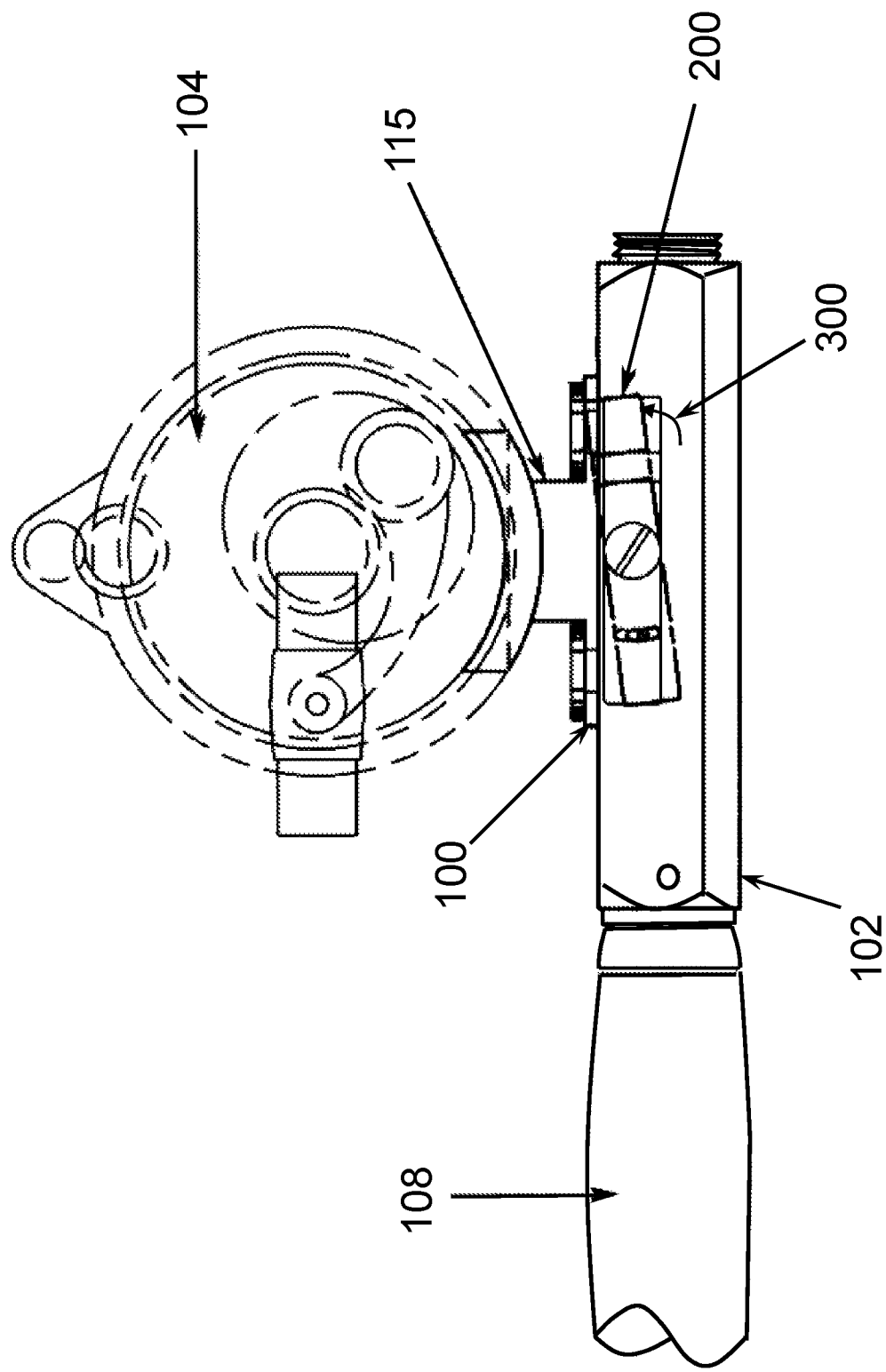
FIG. 3 is a left, side-view illustration, depicting the reel foot as fully engaged with the reel seat of the butt connector.

The locking mechanism 200 is further illustrated in FIG. 3, which is a side-view illustration depicting the reel foot 100 as attached with the butt connector 102. As shown, the reel 104 is fixedly attached with the butt connector 102 through the reel foot 100 and corresponding bracket 115. Once the reel foot 100 is in place, the locking mechanism 200 can pivot 300 up to prevent the reel foot 100 from rotating out of place.

Figure 2:
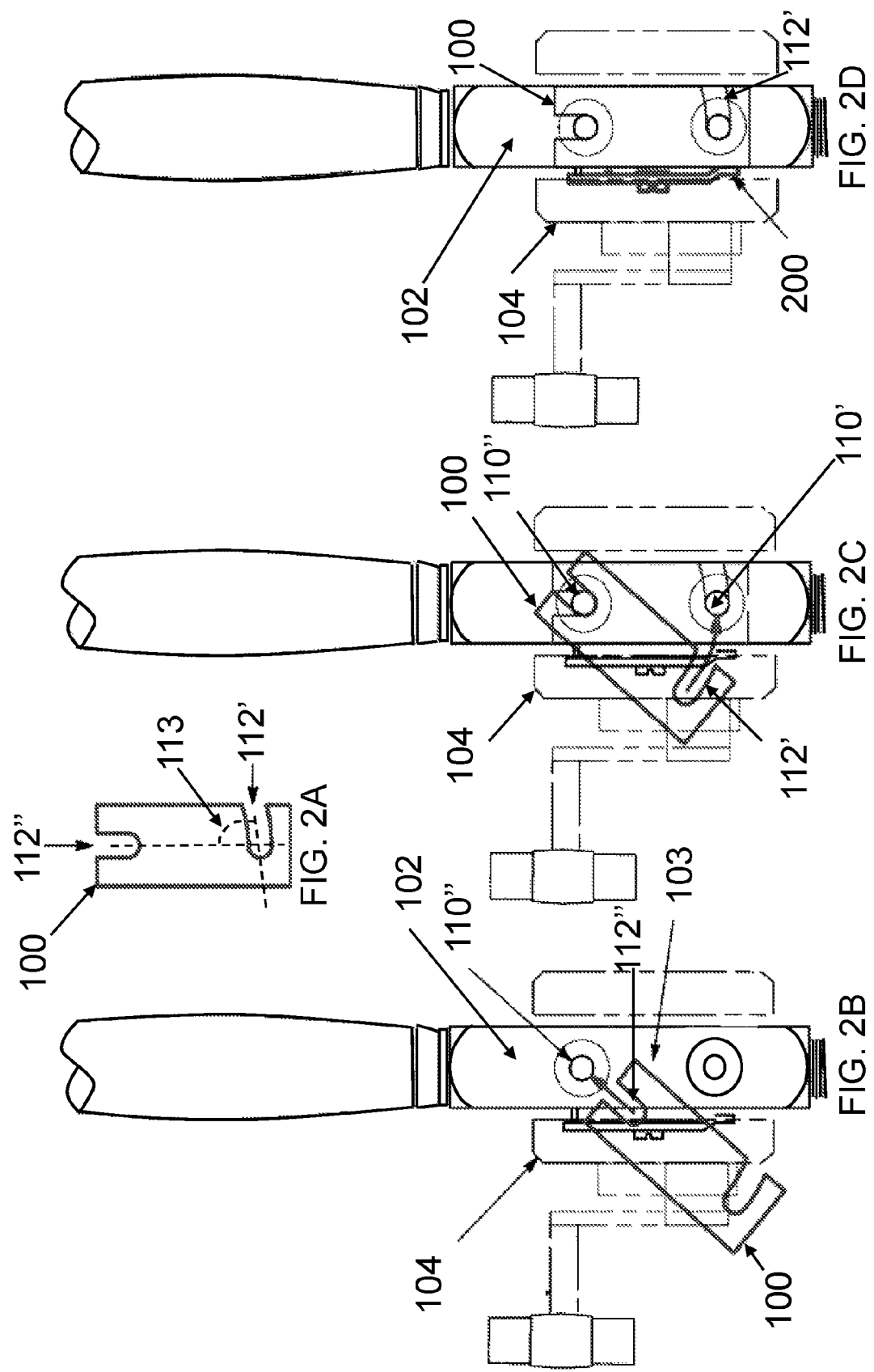
FIG. 2A is an illustration of a reel foot according to the present invention.
FIG. 2B is a top-view illustration, depicting the reel foot as initiating engagement with the reel seat of the butt connector.
FIG. 2C is a top-view illustration, depicting the reel foot as progressively engaging with the reel seat of the butt connector.
FIG. 2D is a top-view illustration, depicting the reel foot as fully engaged with the reel seat of the butt connector.
Figure 4:
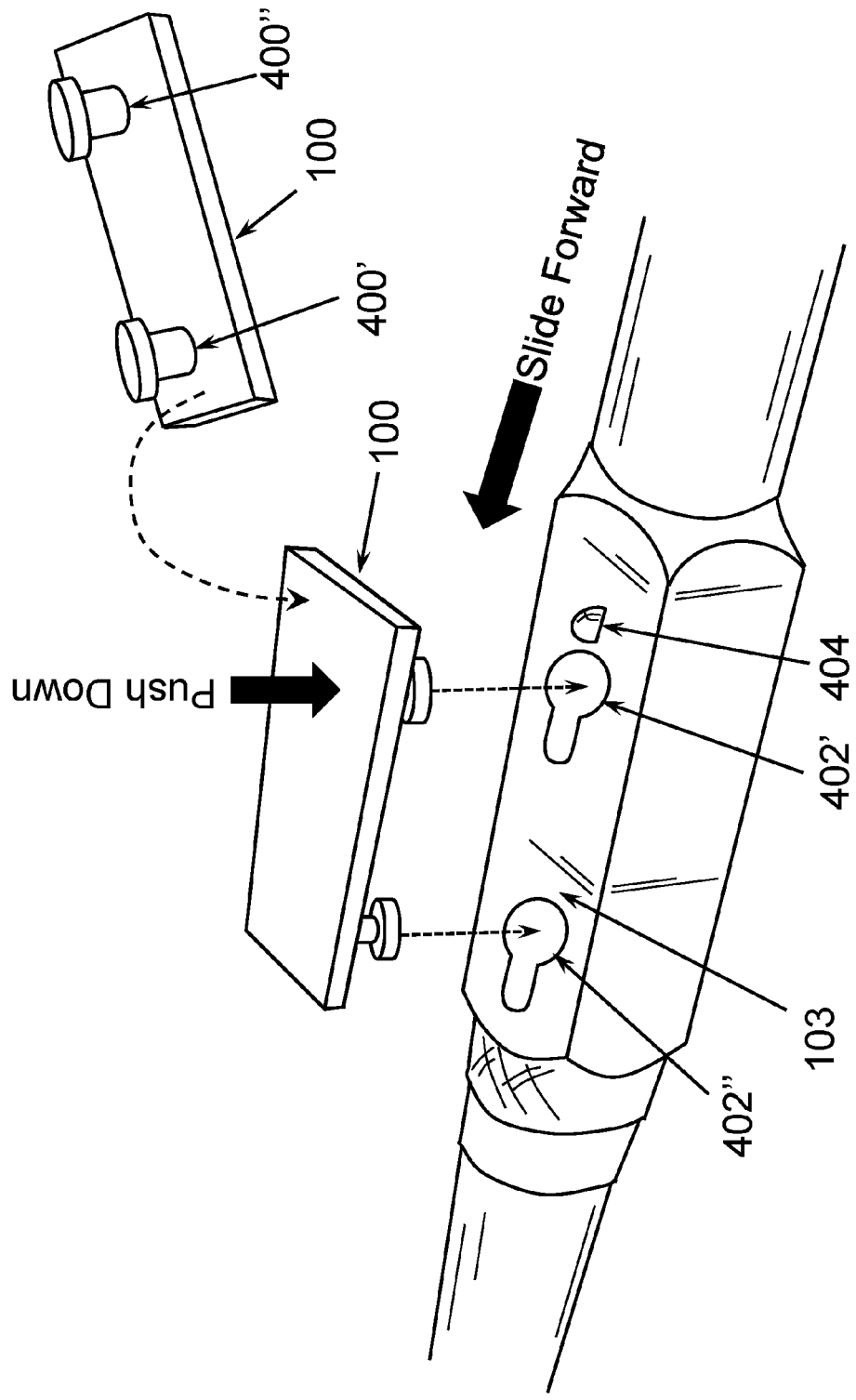
FIG. 4 is an illustration of an alternative aspect, depicting a reel foot as engaging with the reel seat.
Figure 5:
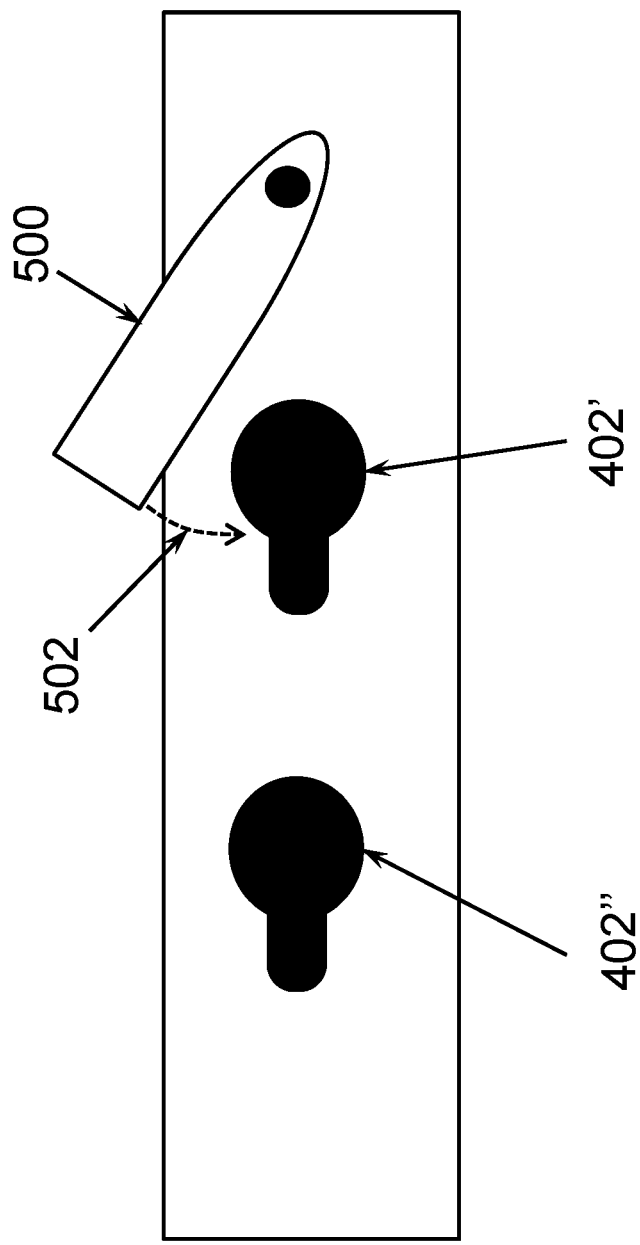
FIG. 5 is an illustration of a locking mechanism for use with the aspect as depicted in FIG. 4.

As can be appreciated by one skilled in the art, there are several various connection techniques/devices/mechanism/etc. for connecting the reel foot 100 with the reel seat 103. Although a single aspect is depicted in FIGS. 1 through 3, the present invention is not intended to be limited thereto and is to be provided the widest scope as understood by one skilled in the art. For example, FIG. 4 depicts yet another connection technique for connecting the reel foot 100 with the reel seat 103. In this aspect, the reel foot 100 includes the posts 400' and 400". Alternatively, the reel seat 103 includes recesses 402' and 402" (such as keyhole recesses) for receiving and connecting with the posts 400' and 400". Thus, in this aspect, the reel foot connector and the reel seat connector are the posts 400' and 400" and the recesses 402' and 402", respectively. Further, FIG. 4 provides another example of a locking mechanism 404. In this aspect, the locking mechanism 404 is a detent button or lock. Alternatively, FIG. 5 provides yet another example of a suitable locking mechanism 500 that can be used with the reel foot 100 and seat 103 depicted in FIG. 4. The locking mechanism 500 depicted in FIG. 5 is a lock bar that pivots 502 into place after the reel seat is positioned into the recesses 402' and 402".

As depicted and referring again to FIG. 1, this is a three piece assembly: (1) a separate rod 106; (2) a separate rod butt 108; and (3) a separate rod butt connector 102 that includes the inventive reel seat 103 (and corresponding posts). The configuration of a three piece rod-reel seat-butt results in a connection of the rod 106 to the reel seat 100 on one end and a connection of the butt 108 section on the other end. In order to accomplish this, each end of the butt connector 102 must have a connection mechanism, such as a recess for the rod 106 piece to enter on one end and a butt 108 piece to enter on the other end. Thus, the rod butt connector 102 (with its reel seat 103) is formed to attach with both the rod 106 on one end and with a rod butt 108 on the other. As a non-limiting example, the butt connector 102 contains a female circular slot on both of its ends. Inside are two bars that secure in place male parts of both the rod 106 and the rod butt 108. Each connection is secured with a ferrule on each end, which is tightened by the screw like portion of connections to the butt connector 102. Alternatively, the butt connector 102 can simply include the necessary male and female threaded components to allow it to be connected between existing rods 106 and butts 108.

Figure 6:
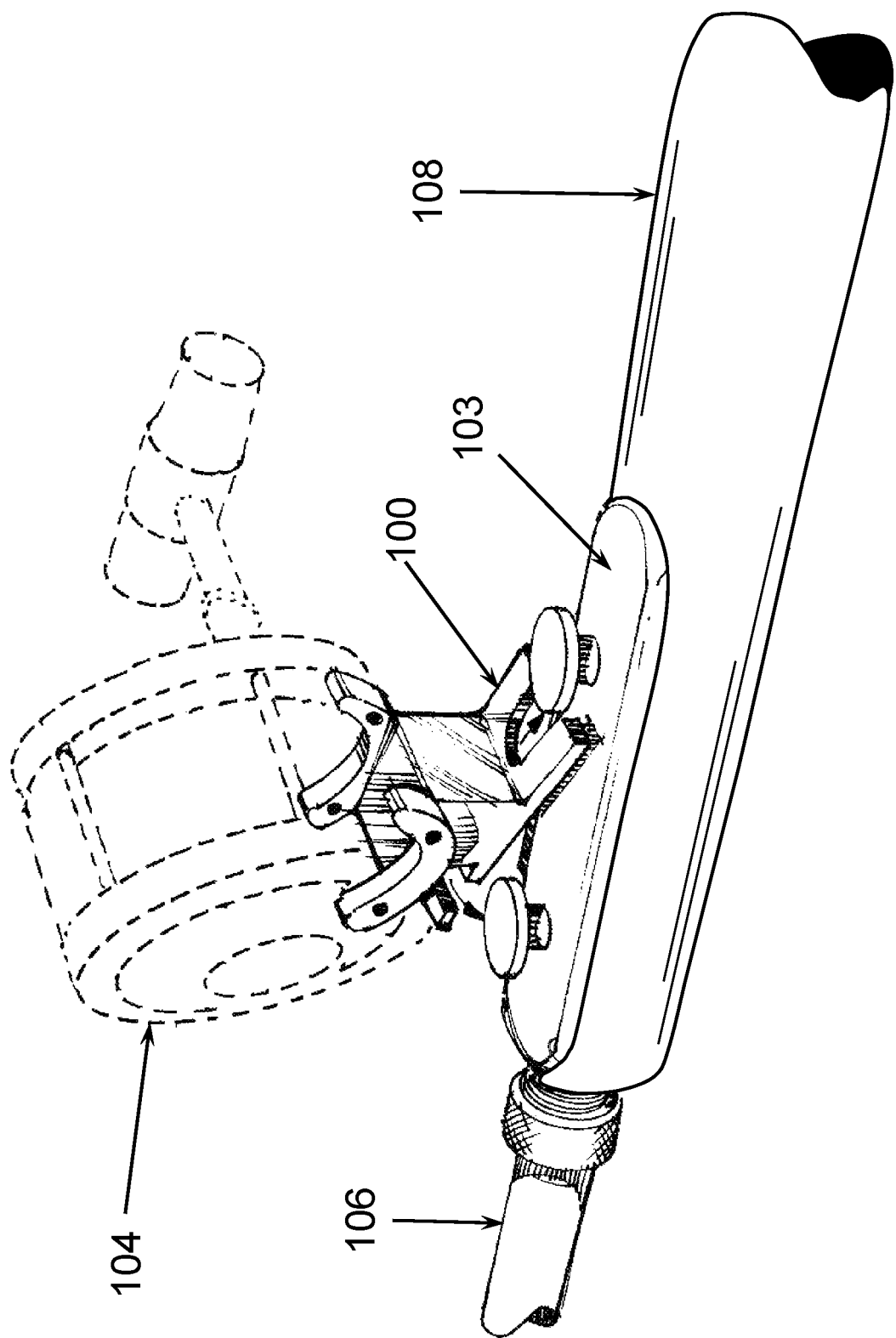
FIG. 6 is an illustration of a reel seat and rod butt according to the present invention.

As described and illustrated above, the present invention can be used to retrofit an existing fishing rod by adding a butt connector 102 between the rod 106 and existing butt 108. However, as can be appreciated by one skilled in the art, the present invention is not intended to be limited thereto as it can be applied to new equipment in which the reel seat 103 and posts 110' and 110" are formed on the existing rod butt. For example, there are no known three piece rod and reel combos in which the reel seat is a separate component. This means that manufacturers of rods would have to redesign the rod 106 and rod butt 108 to conform to the middle section of the reel seat 103. To address this, the rod butt 108 and reel seat 103 can be formed as a single piece. This permits the angler to use different sized rods without having to invest in the reel seat component. In other words and as depicted in FIG. 6, the rod butt 108 and the reel seat 103 can be integrally connected as a single component and the rod 106 could be either heavier or lighter. Thus, in this aspect, there is a two piece assembly that includes a separate rod 106 and a separate rod butt 108 with the reel seat 108 and posts formed thereon. Separately, a fishing reel 104 that includes the reel foot 100 can connected with the reel seat 103.

In summary, the present invention allows a user to quickly attach a reel 104 to a rod butt 108 using a specially designed reel foot 100 and corresponding reel seat 103. All the guess work as far as location of the reel 104 is eliminated. Once locked in place, the reel 104 becomes a structural part of the rod. Thus, the present invention completely refashions both the rod butt 108 and reel seat (with the reel seat 103 being incorporated into the butt connector 102 and/or rod butt 108).

What is claimed is:
1. A fishing rod assembly, comprising:
a reel seat, the reel seat having a reel seat connector for connecting with a reel foot connector;
a reel foot, the reel foot having a reel foot connector for connecting with the reel seat connector;
a bracket connected with the reel foot, with a fishing reel connected with the bracket, thereby allowing a user to quickly attach a fishing reel with the reel seat;

wherein the reel seat is formed on a surface of a butt connector, with the butt connector being formed to connect with and between a fishing rod and a rod butt;

wherein the reel seat connector includes two posts that project from the reel seat; and wherein the reel foot connector includes two cutouts that traverse the reel foot, the two cutouts formed to engage with the posts of the reel seat and affix the fishing reel with the butt connector.

2. The fishing rod assembly as set forth in claim 1, wherein the cutouts are formed such that an angle exists between the cutouts, the angle being less than ninety one degrees.

3. The fishing rod assembly as set forth in claim 2, further comprising a locking mechanism connected with the butt connector, the locking mechanism formed to allow a user to selectively lock the reel foot with the reel seat.

4. The fishing rod assembly as set forth in claim 3, wherein the locking mechanism is a pivoting bar that can be pivoted up to prevent the reel foot from swinging away from the reel seat.

5. A fishing rod assembly, comprising:
a reel seat, the reel seat having a reel seat connector for connecting with a reel foot connector;
a reel foot, the reel foot having a reel foot connector for connecting with the reel seat connector;
a bracket connected with the reel foot, with a fishing reel connected with the bracket, thereby allowing a user to quickly attach a fishing reel with the reel seat;
wherein the reel seat is formed on a surface of a butt connector, with the butt connector being formed to connect with and between a fishing rod and a rod butt; and
wherein reel seat connector includes two recesses formed therein and the reel foot connector includes two posts for positioning within the recesses.

6. A fishing rod assembly, comprising:
a reel seat, the reel seat having a reel seat connector for connecting with a reel foot connector;
a reel foot, the reel foot having a reel foot connector for connecting with the reel seat connector;
a bracket connected with the reel foot, with a fishing reel connected with the bracket, thereby allowing a user to quickly attach a fishing reel with the reel seat; and
wherein the reel seat is formed on a surface of a rod butt, with the rod butt being formed to connect with and between a fishing rod;
wherein the reel seat connector includes two posts that project from the reel seat; and
wherein the reel foot connector includes two cutouts that traverse the reel foot, the two cutouts formed to engage with the posts of the reel seat and affix the fishing reel with the rod butt.

7. A fishing rod assembly, comprising:
a rod butt connector, the rod butt connector being formed to connect with and between a fishing rod and a rod butt;
wherein the rod butt connector includes a reel seat, the reel seat having two posts projecting therefrom; and
a fishing reel, the fishing reel having a reel foot with two cutouts that traverse the reel foot, the two cutouts formed to engage with the posts of the reel seat and affix the fishing reel with the rod butt connector.

8. A fishing rod assembly, comprising:
a rod butt, the rod butt being formed to connect with a fishing rod, wherein the rod butt includes a reel seat, the reel seat having two posts projecting therefrom;
a fishing reel, the fishing reel having a reel foot with two cutouts that traverse the reel foot, the two cutouts formed to engage with the posts of the reel seat and affix the fishing reel with the rod butt.

* * * * *